United States Patent [19]
Huynh

[11] Patent Number: 5,111,586
[45] Date of Patent: May 12, 1992

[54] VEHICLE WHEEL ALIGNMENT TOOLS

[76] Inventor: Nichol C. Huynh, 505 Harr Dr., Apt. G, Midwest City, Okla. 73110

[21] Appl. No.: 757,771

[22] Filed: Sep. 11, 1991

Related U.S. Application Data

[63] Continuation-in-part of Ser. No. 700,432, May 15, 1991.

[51] Int. Cl.⁵ .............................................. G01B 5/255
[52] U.S. Cl. .................................. 33/203.18; 33/336; 33/645; 33/203
[58] Field of Search ................ 33/203, 203.18, 203.19, 33/203.2, 203.15, 203.16, 203.17, 608, 288, 336, 337, 645

[56] References Cited

U.S. PATENT DOCUMENTS 3,445,936  5/1969  Wilkerson .............................. 33/288
3,869,798  3/1975  Wilkerson ......................... 33/203.18
5,020,231  6/1991  Huynh ............................... 33/203.18

Primary Examiner—Harry N. Haroian
Attorney, Agent, or Firm—Robert K. Rhea

[57] ABSTRACT

Vehicle wheel alignment tools are formed by a pair of upright posts supported from respective wheel by bracket mounting members. The top end portion of the respective post is provided with a horizontal and vertical slots for respectively receiving an edge portion of a planar protractor plate having a protractor scale thereon. With the protractor plates in the horizontal post slot and a flexible strand extending between the centers of the protractor scales and intersecting the protractor scale indicia on the respective plate, the toe-in angle of the vehicle wheels is indicated. With the protractor plates disposed in vertical planes in the post top end slots and the protractor scales disposed horizontal or vertical, a string extending between the protractor scale or plumb bob cords secured to the centers and intersecting the respective protractor scale indicia respectively indicates camber and caster angles.

4 Claims, 4 Drawing Sheets

VEHICLE WHEEL ALIGNMENT TOOLS

CROSS REFERENCE TO RELATED APPLICATION

This application is a continuation-in-part of an application filed by me in the United States Patent and Trademark Office on May 15, 1991, Ser. No. 07/700,432 for VEHICLE ALIGNMENT TOOL.

BACKGROUND OF THE INVENTION

1. Field of the invention

This invention relates to automotive maintenance and more particularly to wheel alignment apparatus. This invention reduces the number of devices used for wheel alignment to a pair of identical portable wheel alignment measuring tools which simplifies the wheel alignment process by obtaining wheel toe-in, camber and caster angle measurements at one position. Operation of the tools is not affected by the supporting floor inclination.

2. Description of the prior art

The most pertinent patent is believed to be my U.S. Pat. No. 5,020,231, which discloses a pair of upright posts respectively connected to the respective front wheel of a vehicle for testing wheel alignment angle measurements.

Each posts horizontally supports a plate at its upper end on which a pair of gears are intermeshed and a pointer indicates an angle value on a scale in accordance with the position of the wheels.

This invention is distinctive over the above patent by utilizing protractor scales on protractor plates removably supported by posts vertically disposed adjacent respective front wheels in which the plates are selectively positioned relative to the posts for determining toe-in, caster or camber angles of vehicle wheels.

SUMMARY OF THE INVENTION

These wheel alignment tools including a pair of upright posts, each having wheel mounting bracket members at their depending end portions for connection with the lateral outward side of a vehicle wheel, are provided at their upper end portion with a top end and a lateral slot for respectively receiving a protractor plate, having a protractor scale thereon. The protractor plates may be disposed in a selected vertical or horizontal position in the respective slot.

An elongated strand extending between protractor plate centers indicates the angle of toe-in, camber or caster measurement of the respective wheel at the intersection of the strand with the respective protractor scale.

The principal object of this invention is to provide a pair of vehicle wheel alignment measuring devices which will easily and quickly measure the respective alignment angle of vehicle wheels without moving the vehicle, and which may be used by a vehicle owner.

DESCRIPTION OF THE PREFERRED EMBODIMENTS

Figure 1:
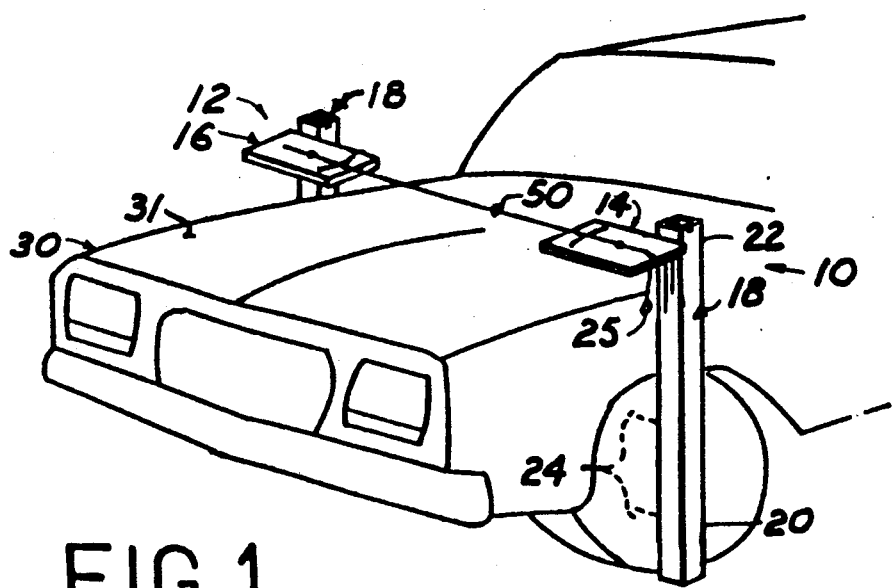
FIG. 1 is an isometric view of the tools in operative position on the front wheels of a vehicle, the latter being shown in fragmentary outline.

Like characters of reference designate like parts in those figures of the drawings in which they occur.

Figure 2:
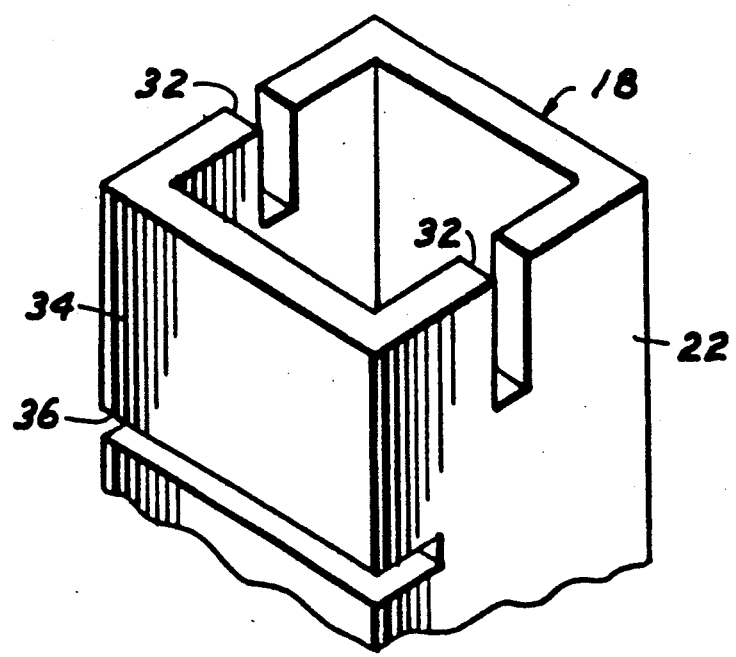
FIG. 2 is a fragmentary isometric view, to a larger scale, of the top end portion of one tool post.

In the drawings:

Referring first to FIGS. 1 and 2, the reference numerals 10 and 12 indicate a pair of vehicle wheel alignment tools. Each tool of the pair of tools 10 and 12 is provided with a protractor plate 14 and 16, respectively.

Since each tool and protractor plate is identical in construction with respect to the other, only the tool 10 will be described in detail in the interest of brevity.

The tool 10 includes an elongated rectangular tubular post 18 preferably square in transverse section having a depending end portion 20 and a top end portion 22.

The depending end portion of each post is provided with bracket members 24, indicated by dotted lines, for connecting the respective post 18 to vehicle wheels 26 and 28 on a vehicle 30 shown in fragmentary outline, only one wheel being shown in FIG. 1. The length of each post 18 is preferably such that it at least projects above a horizontal plane defined by the hood 31 of the vehicle 30.

The upper end edge of opposing walls of the post end portion 22 are medially slotted vertically in aligned relation, as at 32. One wall 34 of the post upper end portion is horizontally slotted adjacent its upper limit, as at 36, normal to the vertical walls of the slots 32.

The thickness of the slots 32 and 36 is selected in accordance with the thickness of the protractor plate 14 for receiving an edge portion thereof as presently explained. The depth of the respective slot 32 and 36 is less than one-half the transverse dimension of the post 18.

Figure 3:
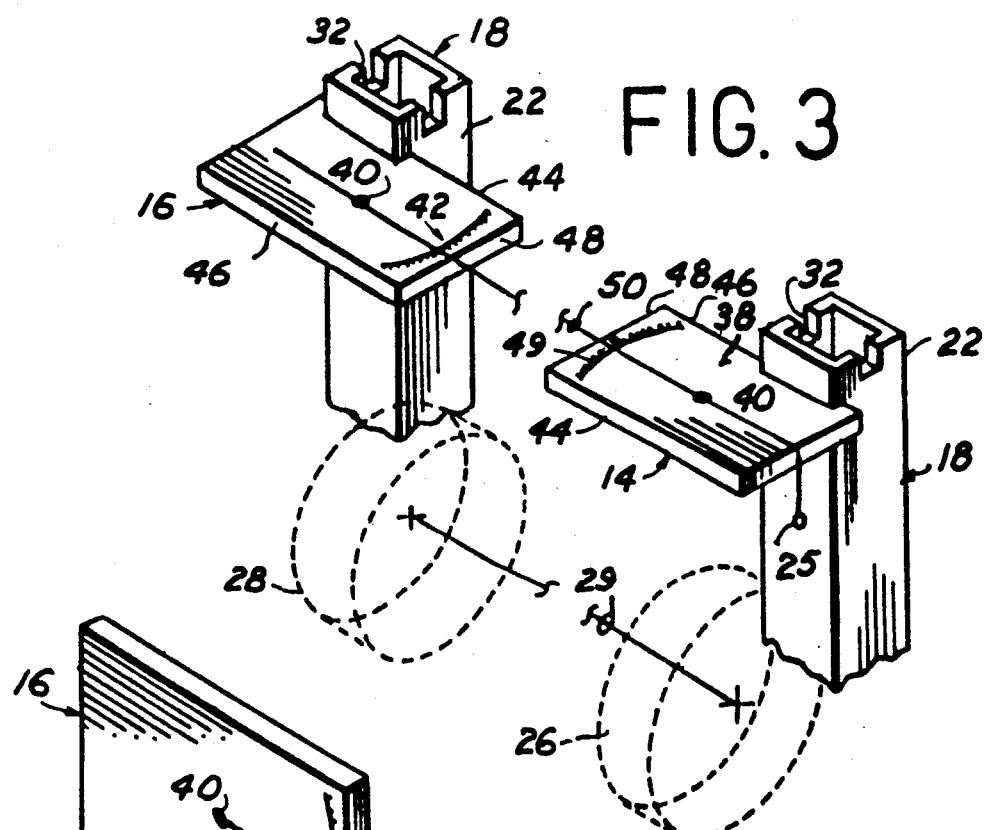
FIG. 3 is a fragmentary isometric view similar to FIG. 1, to a larger scale, illustrating axle and wheel positions by broken lines.
Figure 4:
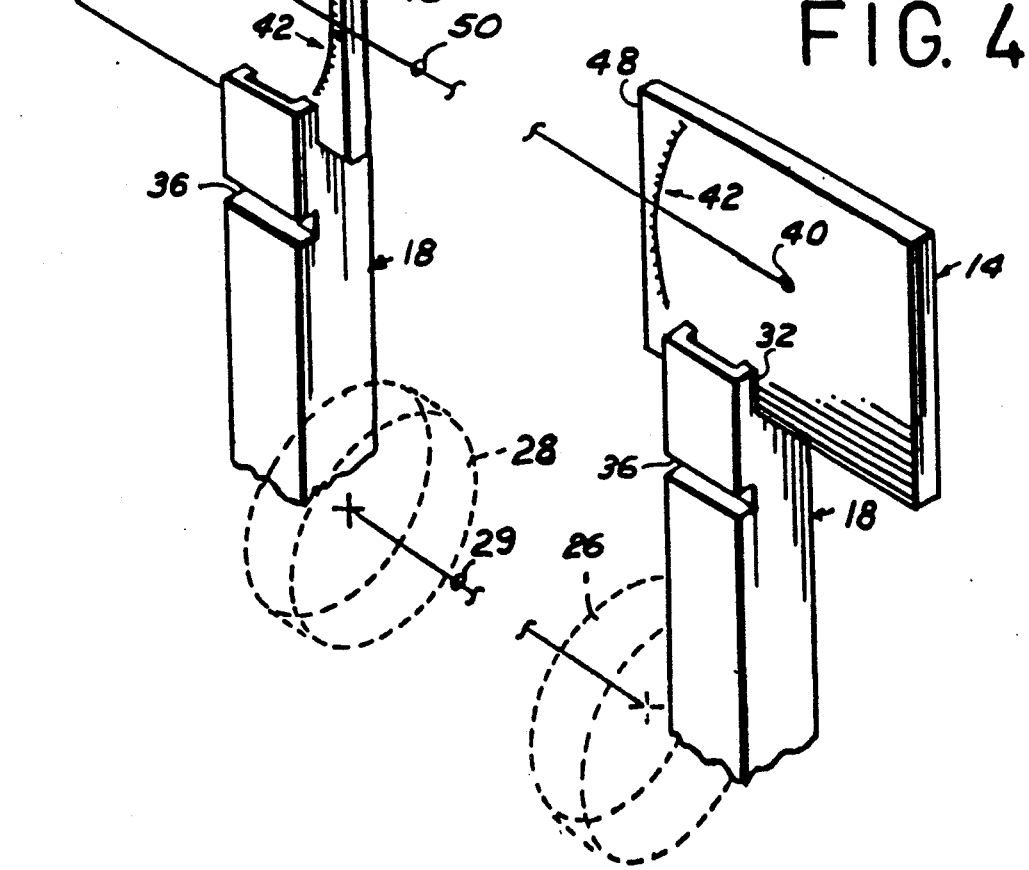
FIG. 4 is a fragmentary isometric view similar to FIG. 3 with components positioned for camber angle measurements.

As best shown by FIGS. 3 and 4, the protractor plate 14 is rectangular planar in overall configuration with the thickness dimension to be cooperatively received by either of the slots 32 and 36 for the purposes presently explained.

One surface 38 of the protractor plate is provided with a central or center point 40 and a protractor scale 42 with the scale 42 extending between the side edges 44 and 46 adjacent the end edge 48 of the protractor plate. The protractor scale is provided with indicia 49 extending in opposing directions from a central or zero scale position to indicate degrees or deviation from the center point of the scale for the purposes presently explained.

Front Wheel Toe-In Test

To determine the toe-in angle of vehicle front wheels, position the wheels in straight ahead direction and connect each post 18 of the tools to the respective front wheel 26 and 28 by the mounting means 24 so that the relative position of each post 18 is the same relative to each wheel.

The depending end of the respective post may be supported by a common support surface such as a floor, not shown. Each post being oriented vertically as by using a plumb bob 25 or spirit level, not shown, with the top slots 32 of the posts being parallel with the front wheel axle 29 and aligned transversely of the vehicle 30.

Insert a portion of each side 46 of the respective protractor plate 14 and 16 into the horizontal post slots 36, as shown by FIGS. 1 and 3, being sure that each protractor plate occupies the same position with respect to the post and that the protractor plate ends 48 are in confronting relation.

Connect the center points 40 of the respective protractor with the other by a flexible strand, such as a string 50. The position of the string, with respect to the protractor scales 42, indicates the toe-in angle of the wheels.

Front Wheel Camber Test

To test the camber angles of the vehicle front wheels 26 and 28 use the same set up of the tool posts 18 as mounted on the front wheels for the toe-in test. Reposition the protractor plates 14 and 16 so that the protractor sides 46 are disposed within the body top slots 32 and the planes of the protractors are vertical and in alignment transversely of the vehicle and the scales 42 in confronting relation.

With the string 50 extending between the protractor plate centers 40, the wheel camber angles are shown on the respective protractor scales 42 by the position of the string, relative to the scales.

Front Wheel Caster Test

For testing the caster angle of vehicle front wheels 26 and 28, assuming the tool posts have been positioned as described hereinabove for the camber angle testing of FIG. 4. Insert the protractor plates end edge 48 in the slots 32 with the scales 42 disposed downwardly, attach the cord of the plumb bob 25 to the center 40 of the protractor scale 42. One wheel is tested at a time to obtain the caster angle.

With the wheel 26 positioned in the straight ahead direction, draw a center line forward from the front center of the wheel on the floor as a reference line, not shown, then scribe or mark a 20° angle line from each side of the center reference line. Turn the wheel 26 inward 20° and observe the camber angle by the plumb cord on the protractor scale 42. Turn the wheel 26 beyond the reference line to 20° outward and similarly note the camber angle. The difference between the two camber angles of the wheel under test is the caster angle of that wheel. This procedure is to be identically repeated for the opposite wheel.

Rear Wheel Toe-In Test

Figure 5:
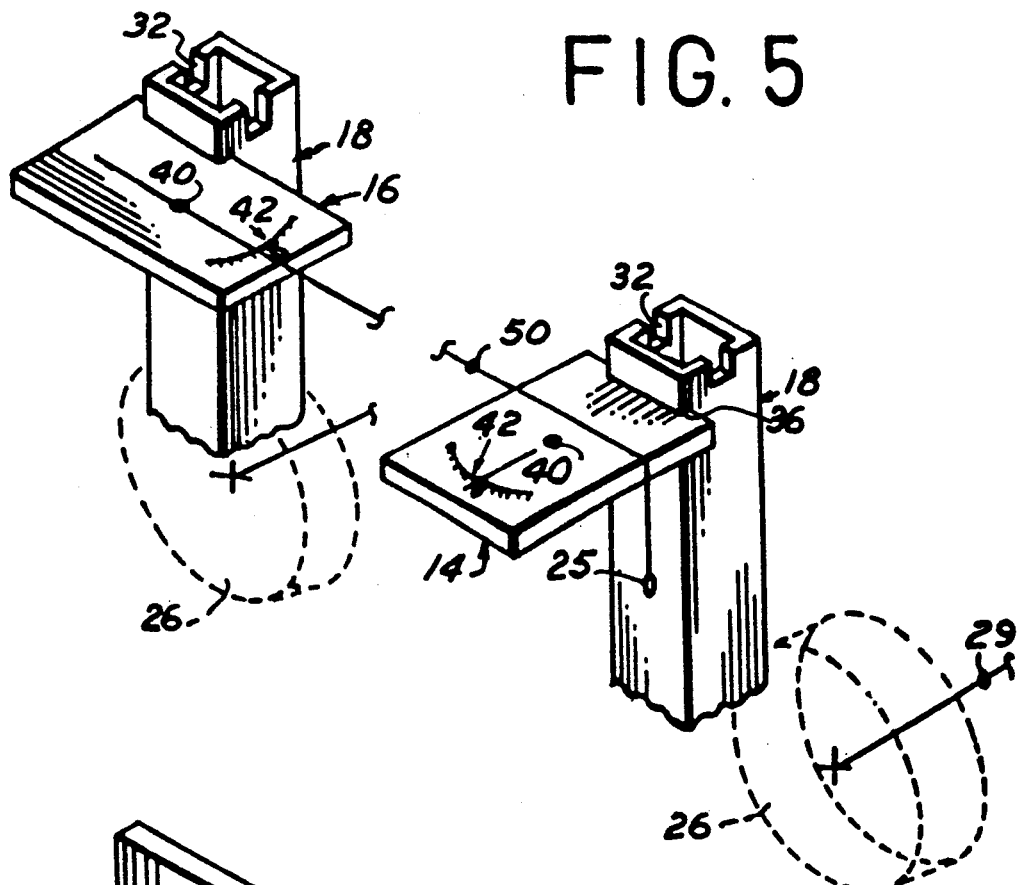
FIG. 5 is a isometric view similar to FIG. 3 when measuring the toe-in angle of a back wheel with reference to a front wheel.
Figure 6:
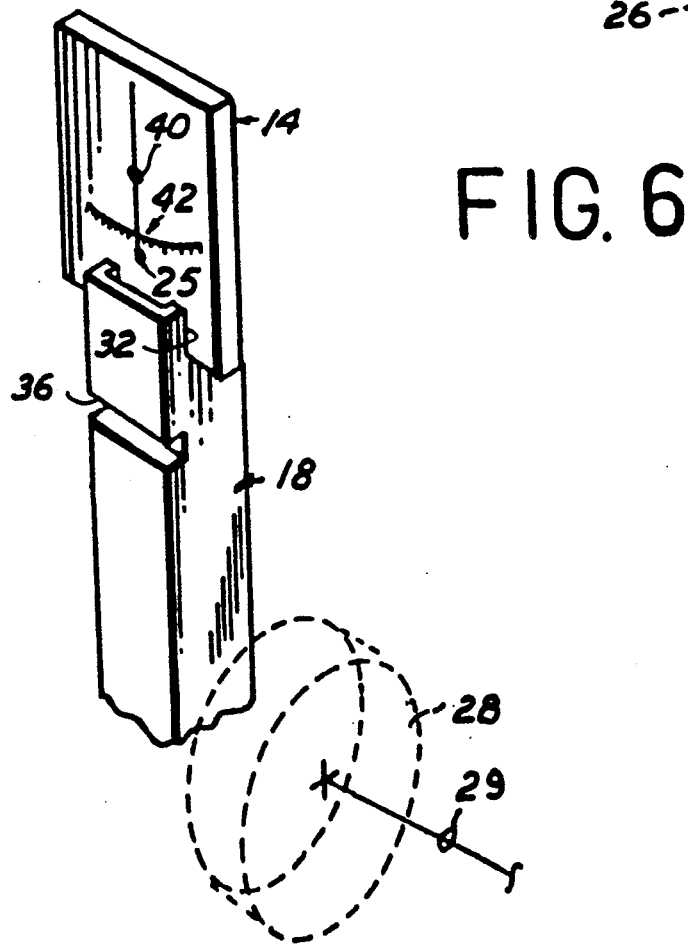
FIG. 6 is a fragmentary isometric view illustrating the position of one tool components for one wheel caster angle measurement, the wheel being shown by broken lines.

Referring more particularly to FIG. 5, the procedure for testing the toe-in angle of a rear wheel 26' is shown.

One post 18 is mounted on the front wheel 26 and plumbed vertical. The post top slots 32 are aligned with the vehicle direction of travel and the lateral slot 36 is disposed laterally outward.

The protractor plate 14 is inserted into the front wheel post slot 36 with the side 44 of the protractor plate parallel with the front wheel axle 29.

The other tool post is similarly connected with the rear wheel 26' and the protractor plate 16 is positioned so that its side 44 is within the post horizontal slot 36 with the protractor scale 42 projecting toward the forward or front protractor 14.

The strand 50 is connected with the center of the protractor plate 16 and extended centrally across the forward protractor 14 with a plumb bob 25 attached to its forward end. The string is oriented relative to the protractor side edge 44 so that it is normal thereto. The intersection of the string 50 with the toe-in scale on the protractor plate 16 mounted on the back wheel is the toe-in angle of the back wheel, with reference to the front wheel. This procedure is identically followed in testing the toe-in angle of the opposite back wheel on the opposite side of the vehicle.

Wheel Position Testing

Figure 7:
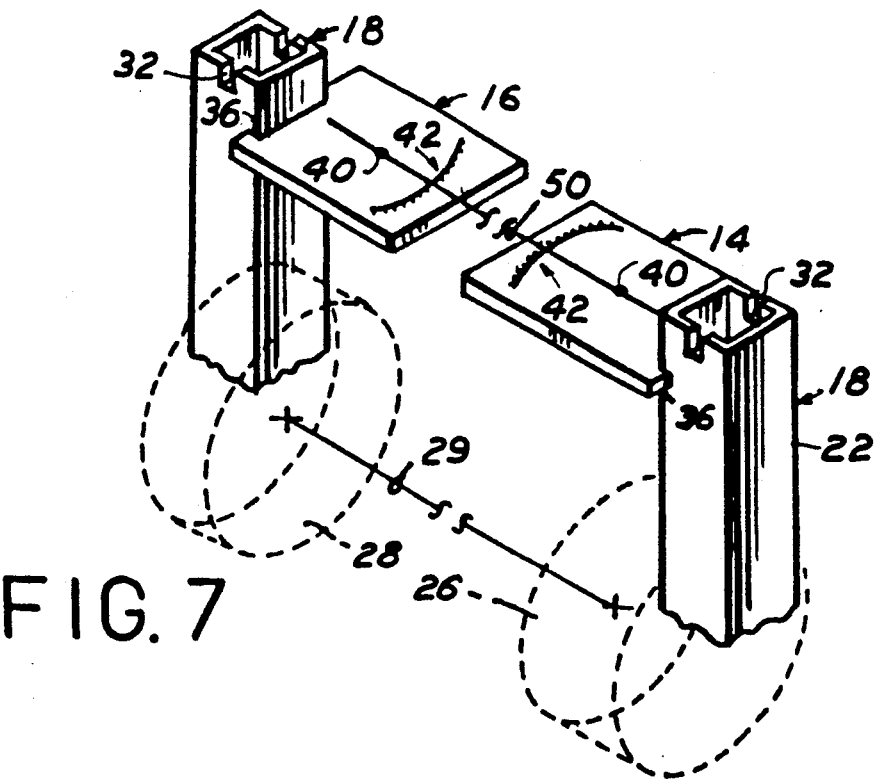
FIG. 7 is a fragmentary isometric view similar to FIG. 3 with the tool components oriented to measure rear wheel toe-in angle; and, FIG. 8 is a perspective view, to another scale, illustrating an alternative embodiment of the protractors.

The forward or rearward wheel position of one wheel relative to its opposite or companion wheel and the vehicle chassis is shown by the arrangement of the tools in FIG. 7.

The posts 18 of the respective tool are connected to the wheels 26 and 28 with the top post slots 32 parallel with the direction of travel and the horizontal slots 36 disposed in confronting relation.

Protractor plate end portions, opposite the protractor scales, are inserted into the respective body slot 36.

The string 50, is extended between the centers 40 of the protractor scales. If the scale intersection with the string reads zero, then both wheels are in a straight forward position. If one wheel toe-in angle is not zero, that wheel is either forward or backward with respect to the opposite wheel.

Figure 8:
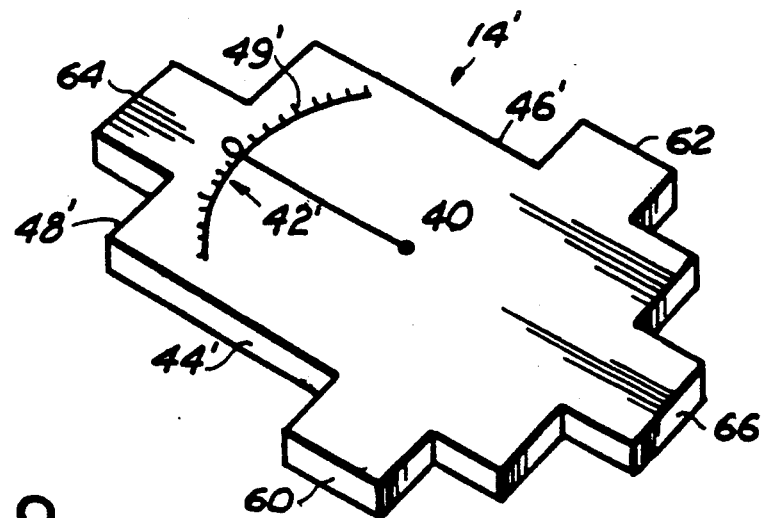

A preferred embodiment of the protractor plates is indicated at 14', FIG. 8. This protractor plate is similarly formed rectangular planar having opposing sides edges 44' and 46' and a protractor scale 42' adjacent its end edge 48' with the protractor scale similarly being characterized by a zero position with indicia on either side thereof and a center point 40'.

The protractor plate 14' is characterized by a pair of rectangular tabs 60 and 62 secured in coplanar relation to opposing sides 44' and 46' of the protractor plate.

The purpose of these tabs and their dimensions is such that they enter the respective slot 32 or 36 and their transverse dimension is cooperatively nested by the bore of the respective post 18. This ensures that the protractor plate is identically positioned relative to the post each time it is inserted into one of the respective slots.

Similarly, a second pair of similar tabs 64 and 66 are centrally secured to the respective end portions of the protractor plate 14' for positioning respective end portions of these tabs in the post slots.

Obviously the invention is susceptible to changes or slaterations without defeating its practiceability. Therefore, I do not wish to be confined to the preferred embodiment shown in the drawings and described herein.

I claim:

1. A vehicle wheel alignment testing apparatus comprising:

a pair of support posts having upper and lower end portions, the upper end portion of each post of said pair of posts having a transverse end slot and a transverse wall slot;

mounting means at the lower end portion of each post of said pair of posts for connecting each post in a vertical plane to the respective wheel of a pair of vehicle wheels;

a pair of protractor plate means including a protractor scale having a center point on each plate means of said pair of protractor plate means, each plate means of said pair of plate means being supported by a selected one of the slots in the upper end portion of each post of said pair of posts for cooperatively supporting said protractor scales in selected horizontal or vertical coplanar relation; and, strand means extending between the center points of said protractor scales and intersecting the respective protractor scale for indicating the angular position of each wheel of said pair of wheels relative to each other and the vehicle chassis.

2. The apparatus according to claim 1 in which each protractor plate means of said pair of protractor plate means comprises:

a rectangular planar plate, said protractor scale being disposed transversely of the respective plate adjacent one end thereof and being characterized by angle indicating indicia on either side of a zero scale position.

3. The apparatus according to claim 2 in which the side walls defining the end slot of each post of said pair of posts are vertical and the side walls defining the wall slot are horizontal and parallel with respect to the vertical slot walls.

4. The apparatus according to claim 3 in which each post of said pair of posts in tubular and in which each plate of said protractor plates further includes:

an outstanding tab secured in coplanar relation to its respective side and end edge surface.

* * * * *